April 7, 1970 H. L. ROSE 3,504,690

PRESSURE BAND DETECTOR

Filed Oct. 14, 1965

INVENTOR
HOWARD L. ROSE

BY Hurvitz + Rose

ATTORNEYS

United States Patent Office
3,504,690
Patented Apr. 7, 1970

3,504,690
PRESSURE BAND DETECTOR
Howard L. Rose, 8823 Lanier Drive,
Silver Spring, Md. 20910
Filed Oct. 14, 1965, Ser. No. 495,963
Int. Cl. F15c 1/14, 4/00
U.S. Cl. 137—81.5 10 Claims

ABSTRACT OF THE DISCLOSURE

A pressure band detector comprising first and second fluid amplifiers each having a power nozzle for issuing a power stream, an output passage, and a pair of control nozzles. The output passage of the first amplifier has a narrow ingress orifice relative to the apex of the power stream at said orifice. An input signal to be detected is applied to one of the control nozzles of the first amplifier and an adjustable bias pressure is applied to the other control nozzle to limit the portions of said pressure profile alignable with said ingress orifice. The output passage of said first amplifier is connected to a control nozzle of said second amplifier and provides an input signal therefor. A further adjustable bias pressure is connected to the other control nozzle of the second amplifier to limit the range of pressures received at the output passages of said second amplifier due to deflection of the second amplifier power stream by the second amplifier input signal.

The present invention relates to a pure fluid system and, more particularly, to a pressure band detector in which the width of the band of pressures to be detected may be varied as well as the absolute values at the extremities of the band.

It is an object of the present invention to provide a pure fluid system having a high degree of flexibility in selecting the width of a band of pressures to be detected as well as the absolute pressures over which the band is operative and which device is quite simple in structure.

The above and still further objects, features and advantages of the present invention will become apparent upon consideration of the following detailed description of specific embodiments thereof, especially when taken in conjunction with the accompanying drawing, wherein.

Figures 1, 2, 3, 4:
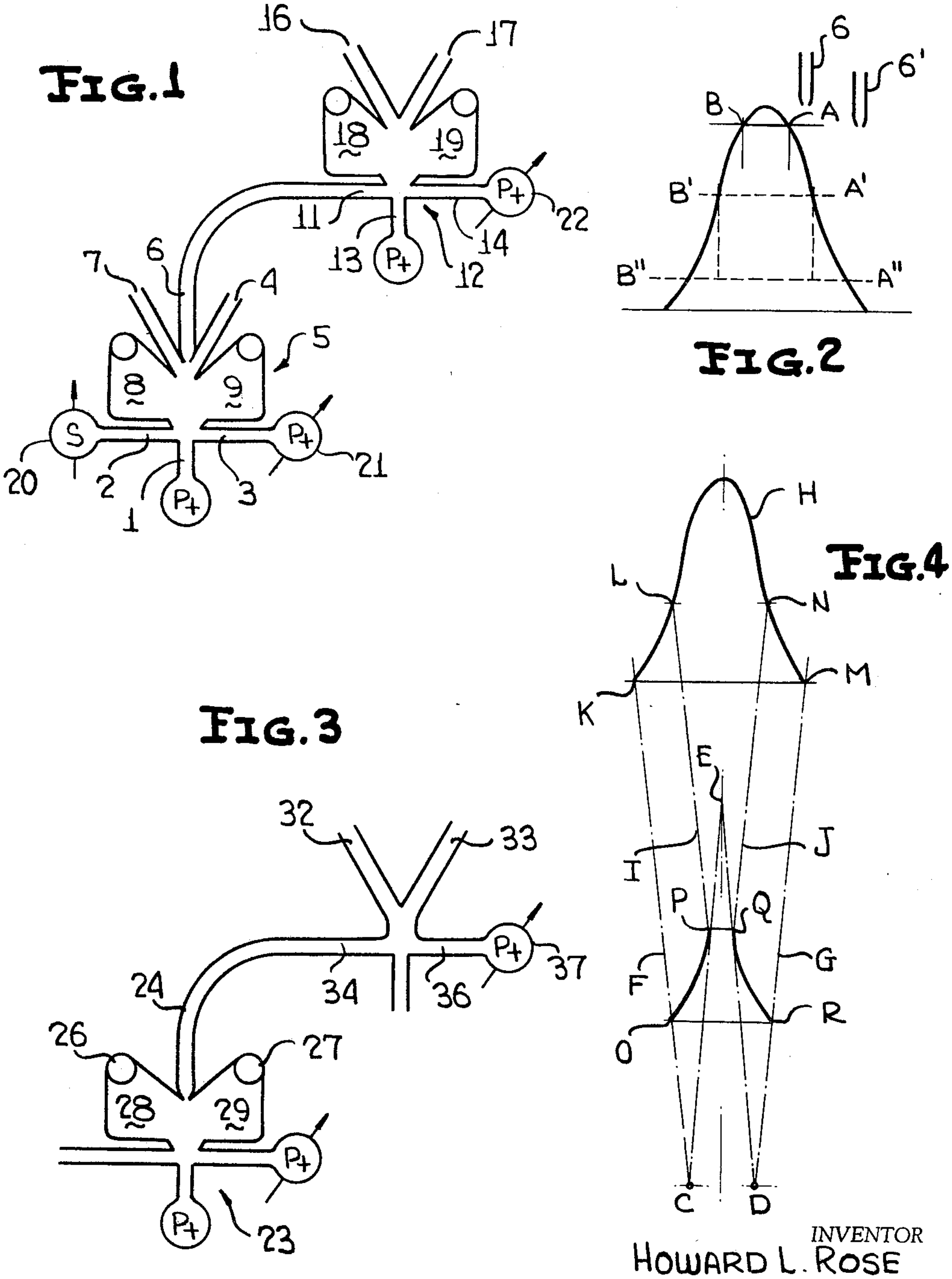
FIGURE 1 is a schematic diagram of one embodiment of a pure fluid system of the present invention.
FIGURE 2 is a curve illustrating one form of pressure characteristic which may be employed in the apparatus of the present invention.
FIGURE 3 is a schematic diagram of a second embodiment of a pure fluid pressure band detector.
FIGURE 4 is a graph illustrating various characteristics of a submerged stream of fluid which graph may be employed in locating the ingress orifice of a fluid amplifier to obtain specific pressure band characteristics.

Referring specifically to FIGURE 1, there is illustrated a pure fluid proportional amplifier 5 comprising a power nozzle 1, control nozzles 2 and 3 and three output passages 4, 6 and 7. Since the device is a proportional unit, boundary layer effects are to be eliminated, this being accomplished by vented regions 8 and 9 disposed on opposite sides of the centerline of the device. It will be noted that the width of the opening or ingress orifice, to the output passage 6 is quite small relative to the width of the output passages 4 and 7. More particularly, the width of the ingress orifice is small compared with the change of pressures with displacement of the power stream over the operating range of the device.

The passage 6 is connected to a control nozzle 11 of a second fluid amplifier 12 having a power nozzle 13, a second control nozzle 14 and output passages 16 and 17. Since the apparatus is intended to be in one form, a proportional unit, the amplifier 12 is provided with enlarged regions 18 and 19 suitably vented to atmosphere or to another source of ambient or constant pressure.

Referring now specifically to FIGURE 2 of the accompanying drawings, there is illustrated the pressure profile of the power stream at a specific location downstream from the egress orifice of the nozzle 1. In a particular arrangement, this profile appears at about eight widths of the power nozzle 1 downstream thereof. It is assumed, for purposes of explanation, that a flow is provided to the control nozzle 3 from a variable pressure source 21 of such a magnitude that a point A, on the pressure profile of FIGURE 2, is disposed immediately to the left of the output passage 6 of the amplifier. It will be noted that there is a point B on the pressure profile at precisely the same pressure as the point A, but located on the opposite side of the centerline of the pressure profile. Further, a variable pressure source 22, connected to the control passage 14 of the second stage amplifier 12, is adjusted so that when the pressure supplied to the nozzle 11 is less than the pressure represented by a line drawn between points A and B, hereinafter referred to as line A–B, all of the fluid supplied to the amplifier by the power nozzle 13 is directed to the output passage 16. Only when the pressure of the fluid applied to the control nozzle 11 exceeds the pressure represented by line A–B does fluid flow to the output passage 17.

If now, a pressure to be detected is applied to control nozzle 2 from a signal source 20 and this pressure is insufficient to deflect the power stream so that the pressures greater than at point A are presented to the output passage 6 or the pressure is sufficient to deflect the power stream so far that the point B on the pressure profile moves to the right of the output passage 6, then the fluid in the second stage of amplification flows through the output channel 16. On the other hand, if the signal applied to the control nozzle 2 is of the proper strength, a portion of the pressure profile above the line A–B of FIGURE 2 is presented to the output channel 6 and a portion of the stream of the amplifier 12 is directed to the output passage 17. Thus, only when the signal is within the proper range of pressures or mass flows, as the case may be, does the flow become directed to the output passage 17. If the pressure is either below or above this band of pressures, the second stage device 12 does not provide a flow to the passage 17.

The width of the band selected may readily be varied by changing the bias applied by the source 22. Thus, if the bias is lowered, the line A–B shifts downwardly to the line A′–B′ and flow to the passage 17 results whenever the pressure exceeds the pressure defined by the line A′–B′. This change in bias then has effectively increased the acceptable band of pressures capable of producing flow to be directed to the output passage 17. Conversely, if the pressure supplied by source 22 is raised, the line A–B shifts upwardly and the band of pressures which may be detected is narrowed.

By changing the bias supplied by the source 21 to the control nozzle 3 of the first stage of the amplification, the absolute pressures over which the apparatus operates is changed. Specifically, the bias supplied by the source 21 may be increased so that the stream is moved initially to a position relative to the output passage 6 as indicated by the output passage 6′ of FIGURE 2. It is obvious that the pressure applied to the control nozzle 2 in this latter case must be larger than the pressure originally applied to the control nozzle 2 in the former case in order to cause any fluid of a pressure greater than designated by line A–B to be directed to the output channel 6. Thus, the pressure source 22 controls the width of the pressure band to be investigated and the source 21 determines the absolute pressure limits of the band.

Referring now specifically to FIGURE 3 of the accompanying drawings, there is illustrated a second embodiment of the invention. There is provided a first stage of fluid amplification 23 which is conventional in every respect, except that only a single narrow center output passage 24 is provided. Fluid which does not flow to the passage 24 is diverted to vents 26 and 27 formed in the enlarged regions 28 and 29, respectively, employed to defeat boundary layer effects, and insure proportional operation of the unit.

The second stage of the amplifier, designated by reference numeral 31, is of the boundary layer type and is provided with output passages 32 and 33 and control nozzles 34 and 36. In a device of this type, there is a certain minimum pressure which must be provided in order to overcome the boundary layer effects and produce switching of the stream from an output passage 32 to an output passage 33. Thus, the unit of FIGURE 3 is limited as to range of movement of the line A–B in FIGURE 2. The limitation, however, is only on the lowest portion of the curve of FIGURE 2, and by employing a variable source 37, the line A–B may be raised to any desired height, as illustrated in FIGURE 2, above the minimum height for this device illustrated as a line A″–B″. The limitation imposed by the use of a boundary layer flip-flop type of device of FIGURE 3 is in the least critical range of the apparatus and in a range which, in normal usage, would not probably be examined. In all cases, however, unless manual or automatic feedback reset is to be employed, the bias provided by the source 37 should be enough to always cause the power stream to attach to the sidewall along the left side of the device illustrated in FIGURE 3. Such a bias must be added to the bias resulting from boundary layer lock-on, but since only a very small bias is required to insure that the stream always locks to one wall, the limitation imposed is relatively immaterial.

It is apparent that the amplifier 23 may be employed with a second stage proportional amplifier such as amplifier 12 of FIGURE 1 and the amplifier 5 of FIGURE 1 may be employed with a bi-stable second stage.

The apparatus of the present invention has utility whenever it is desired to determine whether a pressure, which may be derived from any physical phenomena to be controlled, has exceeded a specific limit or lies within a specific desirable range. The output passage 17 of FIGURE 1 or the output passage 33 of FIGURE 3 may be connected to any control device which will respond to flow to these passages to maintain a condition or to respond to flow to the passage to institute a corrective function. It is apparent that the dual output channels of the second stages of both the devices of FIGURE 1 and FIGURE 3 may be employed in push-pull; that is, differentially, to control further fluid amplifiers which may subsequently operate a differential or single ended control or recording device.

The profile of FIGURE 2 represents only one set of operating conditions. The pressure profile for other receiver locations may be determined by reference to FIGURE 4. The points C and D represent the edges of the egress end of a power nozzle. Point E is located along the centerline of the power nozzle six orifice widths downstream thereof. The triangle C–D–E represents a constant pressure region, the pressure of which equals the maximum pressure of the power stream as it leaves the nozzle. A submerged stream diverges at an angle of about six degrees after it leaves the nozzle; this fact being represented by lines F and G. The pressure profile at eight orifice widths downstream of the nozzle is desigated by Curve H.

To determine the pressure profile at any point upstream of the point E, lines designated by letters I and J, are drawn from lines CE and DE parallel to lines F and G, respectively, from the point selected. In the illustration of FIGURE 4, a point X four times the width of the power nozzle, i.e. four times the distance C–D, has been selected.

The lines F and I intersect Curve H at points K and L, and lines G and J intersect Curve H at points M and N, respectively. The pressure profile at the point X is flat between the lines CE and DE, representing a constant pressure and falls away from this level along curves substantially identical with the curves K and L and MN. The profile is designated by the curve O, P, Q, R.

It is apparent from FIGURE 4 that a wide variety of pressure profiles are available for use with the present invention and the final selection of a profile, and therefore placement of the ingress orifice of the center outlet passage, will depend upon the specific use or specific response characteristic desired.

What I claim is:

1. A pressure band detector comprising a proportional fluid amplifier having a power nozzle for issuing a stream of fluid, control nozzles disposed on opposite sides of said power nozzle and at least one output passage located a predetermined distance downstream of said power nozzle, said output passage having an ingress orifice which is narrow relative to the curvature of the pressure profile of the power stream along its steepest portions at said ingress orifice, means for defining the width of the band of pressures to be detected comprising means for applying a first bias pressure to one of said control nozzles, means for applying a signal pressure to the other of said control nozzles, a further fluid amplifier having a power nozzle for issuing a stream of fluid, control nozzles disposed on opposite sides of said power nozzle and a pair of output passages, means for determining limit pressures of a range of pressures within the detected band of pressures comprising means for applying a second bias pressure to one of said control nozzles of said further amplifier, said second bias pressure being less than the maximum pressure of the power stream of said proportional fluid amplifier at its said ingress passage and means for connecting said output passage of said proportional fluid amplifier to the other of said control nozzles of said further fluid amplifier.

2. The combination according to claim 1 wherein said first bias pressure applied to said proportional fluid amplifier is sufficient to deflect its associated power stream such that the pressure presented to the ingress orifice of its said output passage is less than the second bias pressure applied to said one of said control nozzles of said further amplifier.

3. The combination according to claim 1 wherein said further fluid amplifier is a pure fluid bistable device.

4. The combination according to claim 1 wherein said proportional fluid amplifier comprises a single output passage coaxial with said power nozzle.

5. A pure fluid pressure band detector for providing an indication whenever the pressure of a fluid input signal lies within a predetermined range of pressures, said detector comprising:

first and second fluid amplifiers each having a power nozzle for issuing a power stream of fluid, a pair of control nozzles disposed on opposite sides of said power nozzle, and at least one output passage;

means for connecting said output passage of said first amplifier to a first of said control nozzles of said second amplifier;

said output passage of said first amplifier having an ingress orifice which is narrow relative to the curvature of the pressure profile of the first amplifier power stream along its steepest portions at said orifice;

means for determining the width of a band of pressures to be detected including said first fluid amplifier and means for applying a first bias pressure to one of the control nozzles of said first amplifier to deflect the power stream thereof relative to the output passage of said first amplifier;

means for applying said fluid input signal to the other control nozzle of said first amplifier;

means for defining the limits of said predetermined range of pressures within said band of detected pressures including said second fluid amplifier and means for applying a second bias pressure to the other of said control nozzles of said second amplifier to prevent reception of fluid at the output passage of said second amplifier except when the pressure of said fluid input signal lies within said predetermined pressure range.

6. The combination according to claim 5 wherein said first fluid amplifier is of the proportional type and its power nozzle and output passage are coaxial.

7. The combination according to claim 6 wherein said second fluid amplifier is of the bistable type.

8. The combination according to claim 6 wherein said second fluid amplifier is of the proportional type.

9. The combination according to claim 8 wherein said second bias pressure is less than the maximum pressure received by the output passage of said first amplifier.

10. A pressure band detector comprising a proportional fluid amplifier having a power nozzle for issuing a stream of fluid, control nozzles disposed on opposite sides of said power nozzle and at least one output passage located a predetermined distance downstream of said power nozzle, said output passage having an ingress orifice which is sufficiently narrow that the pressure differential across the width of the orifice is small relative to the maximum pressure differential of the relatively constant slope portion of the power stream pressure profile at the downstream location of the orifice, means for defining the width of the band of pressures to be detected comprising means for applying a first bias pressure to one of said control nozzles, means for applying a signal pressure to the other of said control nozzles, a further fluid amplifier having a power nozzle for issuing a stream of fluid, control nozzles disposed on opposite sides of said power nozzle and a pair of output passages, means for determining limit pressures of a range of pressures within the detected band of pressures comprising means for applying a second bias pressure to one of said control nozzles of said further amplifier, said second bias pressure being less than the maximum pressure of the power stream of said proportional fluid amplifier at said ingress orifice and means for connecting said output passage of said proportional fluid amplifier to the other of said control nozzles of said further fluid amplifier.

References Cited

UNITED STATES PATENTS

| | | | |
|---|---|---|---|
| 3,327,725 | 6/1967 | Hatch | 137—81.5 |
| 3,331,379 | 7/1967 | Bowles | 137—81.5 |
| 3,340,885 | 9/1967 | Bauer | 137—81.5 |
| 3,122,165 | 2/1964 | Horton | 137—81.5 |
| 3,159,168 | 12/1964 | Reader | 137—81.5 |
| 3,191,611 | 6/1965 | Bauer | 137—81.5 |
| 3,220,428 | 11/1965 | Wilkerson | 137—81.5 |
| 3,233,622 | 2/1966 | Boothe | 137—81.5 |
| 3,256,899 | 6/1966 | Dexter et al. | 137—81.5 |
| 3,279,488 | 10/1966 | Jones | 137—81.5 |

OTHER REFERENCES

I.B.M. Technical Disclosure Bulletin "Fluid Logic Parity Checking," H. R. Grabb, vol. 6, No. 1, June 1963, pp. 27, 28.

SAMUEL SCOTT, Primary Examiner